US012784469B2

(12) United States Patent
Chien et al.

(10) Patent No.: US 12,784,469 B2
(45) Date of Patent: Nov. 3, 2026

(54) METHOD FOR DETECTING LANE LINES AND ELECTRONIC DEVICE

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 252 days.

(21) Appl. No.: 18/522,549

(22) Filed: Nov. 29, 2023

(65) Prior Publication Data

US 2024/0177499 A1 May 30, 2024

(30) Foreign Application Priority Data

Nov. 30, 2022 (CN) ........................ 202211529910.X

(51) Int. Cl.
*G06V 20/56* (2022.01)

(52) U.S. Cl.
CPC .................................. *G06V 20/588* (2022.01)

(58) Field of Classification Search
None
See application file for complete search history.

(56) References Cited

U.S. PATENT DOCUMENTS 11,417,118 B2 * 8/2022 Shu ........................ G06V 10/82
11,586,218 B2 * 2/2023 Chen .................... G05D 1/0246
2019/0279004 A1 * 9/2019 Kwon .................. G06V 20/588

FOREIGN PATENT DOCUMENTS

CN 111444778 A * 7/2020 ............. G06V 10/56
CN 111898540 A 11/2020
CN 113988112 A 1/2022
CN 115376082 11/2022
CN 115376089 11/2022

OTHER PUBLICATIONS

Translation for CN 111444778 A.*

* cited by examiner

*Primary Examiner* — Vikkram Bali
(74) *Attorney, Agent, or Firm* — ScienBiziP, P.C.

(57) ABSTRACT

A method for detecting lane lines, applied in an electronic device, includes: obtaining road images, and obtaining a splice area by performing an image processing on the road images; inputting the splice area into a preset trained lane line detection model and obtaining lane line detection images; and obtaining transformed images and lane line detection results of the transformed images by performing an image transformation on the lane line detection images. The application is able to improve an accuracy of detecting lane lines.

20 Claims, 4 Drawing Sheets

METHOD FOR DETECTING LANE LINES AND ELECTRONIC DEVICE

This application claims priority to Chinese Patent Application No. 202211529910.X filed on Nov. 30, 2022, in China National Intellectual Property Administration, the contents of which are incorporated by reference herein.

FIELD

The subject matter herein generally relates to a field of image processing, in particular, relates to a method for detecting lane lines and an electronic device.

BACKGROUND

In current scheme for detecting lane lines, due to high brightness of backlit road images, the lane lines in the backlit road images are blurred, making it very difficult to accurately detect the lane lines from the backlit road images, which in turn affects driving safety.

BRIEF DESCRIPTION OF THE DRAWINGS

Implementations of the present application will now be described, by way of embodiment, with reference to the attached figures.

DETAILED DESCRIPTION

Figure 1:
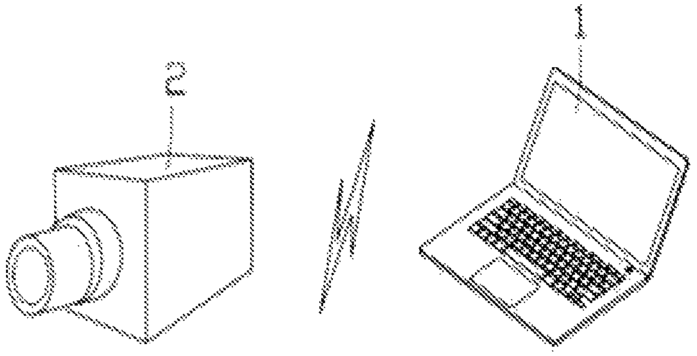
FIG. 1 shows an operating environment of one embodiment of a method for detecting lane lines.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present application.

The present application, including the accompanying drawings, is illustrated by way of examples and not by way of limitation. Several definitions that apply throughout this application will now be presented. It should be noted that references to "an" or "one" embodiment in this application are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an operating environment of a method for detecting lane lines. In one embodiment, the method can be applied in one or more electronic devices 1, and the electronic device 1 is in communication with a camera device 2. In one embodiment, the camera device 2 can be a monocular camera or other device for photographing.

In one embodiment, the electronic device 1 is a device that can automatically perform calculation of parameter value and/or information processing according to pre-set or stored instructions. In one embodiment, hardware of the electronic device 1 includes, but is not limited to a microprocessor, an Application Specific Integrated Circuit (ASIC), a Field-Programmable Gate Array (FPGA), a Digital Signal Processor (DSP), or an embedded device, for example.

In one embodiment, the electronic device 1 can be any electronic product that can interact with a user, such as a personal computer, a tablet computer, a smart phone, a Personal Digital Assistant (PDA), a game console, and an Internet Protocol Television (IPTV), a smart wearable device, for example.

In one embodiment, the electronic device 1 may also include a network equipment and/or a user equipment. In one embodiment, the network device includes, but is not limited to, a single network server, a server group consisting of multiple network servers, or a cloud computing-based cloud consisting of a large number of hosts or network servers. In one embodiment, the electronic device 1 can also be a vehicle-mounted device of a vehicle.

In one embodiment, a network connected to the electronic device 1 includes, but is not limited to, the Internet, a wide area network, a metropolitan area network, a local area network, and a Virtual Private Network (VPN).

Figure 2:
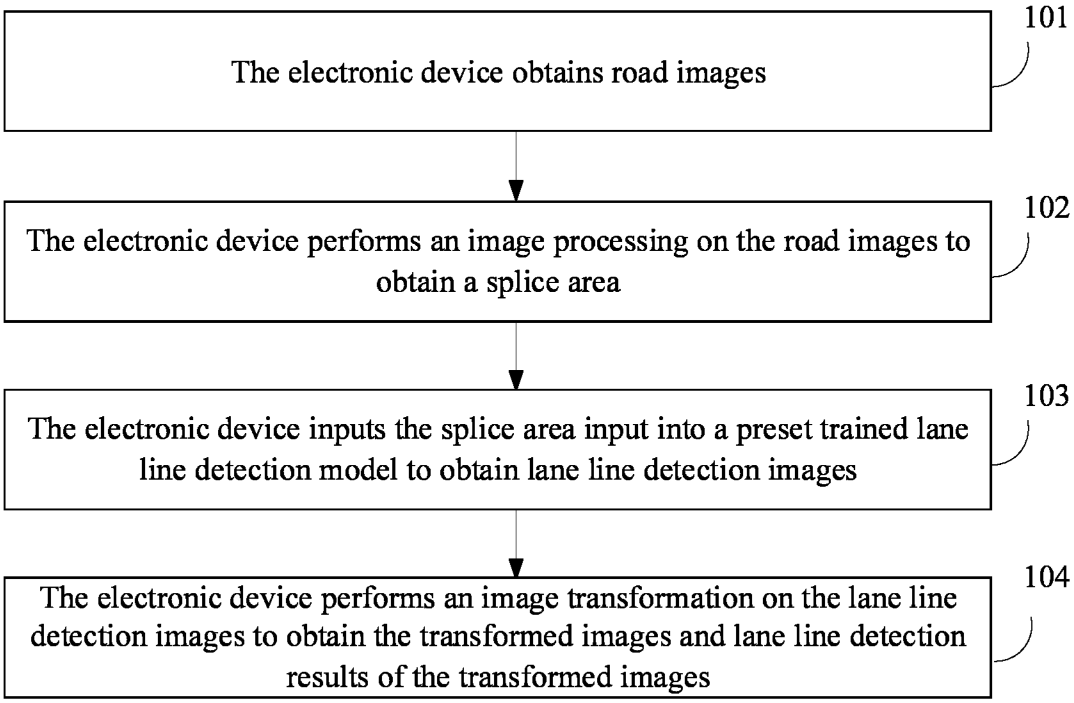
FIG. 2 is a flowchart of one embodiment of the method of FIG. 1.

FIG. 2 illustrates the method for detecting lane lines. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this application.

At block 101, the electronic device obtains road images.

In at least one embodiment, the road images are images of three primary colors (Red Green Blue, RGB). The road images may include objects such as vehicles, ground, lane lines, pedestrians, sky, trees, for example.

In at least one embodiment, the electronic device obtains the road images. In one embodiment, the electronic device obtains the road images by using a camera device to capture a road scene.

In one embodiment, the camera device may be a monocular camera or a vehicle-mounted camera. The road scene may include objects such as vehicles, ground, lane lines, pedestrians, sky, trees, for example.

In one embodiment, the road images include backlit road images, and the backlit road images are images obtained by shooting the road scene against the light by the camera device.

At block 102, the electronic device performs an image processing on the road images to obtain a splice area.

In at least one embodiment of the present application, the image processing includes lane line detection, perspective transformation, histogram equalization and binarization processing, for example.

In at least one embodiment of the present application, a bird's-eye view area of the lane lines is a top view of the lane lines in the road images.

In at least one embodiment of the present application, the electronic device performs the image processing on the road images to obtain the spliced areas. In one embodiment, the electronic device performing the image processing on the road images to obtain the spliced areas includes: the electronic device performs a lane line detection on the road images to obtain a region of interest; further, the electronic device transforms the region of interest to obtain a bird's-eye view area of the lane lines; further, the electronic device performs a grayscale histogram equalization processing on the bird's-eye view area of the lane lines to obtain a grayscale area; and further, the electronic device performs a binarization processing on the grayscale area to obtain a binarized area; the electronic device converts the bird's-eye view area of the lane lines from an initial color space to a target color space to obtain a target area, performs a histogram equalization processing on each channel of the target area to obtain an equalized area; and further, the electronic device generates the splice area based on bird's-eye view area of the lane lines, the grayscale area, the equalization area, and the binarization area.

In one embodiment, the region of interest is an area including the lane lines. The electronic device may perform lane line detection on the road images based on a target detection algorithm. In one embodiment, the target detection algorithm includes, but is not limited to a R-CNN network, a Fast R-CNN network, a Faster R-CNN network, and the like. The initial color space may be an RGB color space, and the target color space may be an HSV color space.

In one embodiment, when the road images are the backlit road images, the lane lines in the backlit road images will be blurred due to the high brightness of the backlit road images. The original projection beamline in the backlit road images can be changed by a perspective transformation, thereby reducing the brightness of the bird's-eye view area of the lane lines. Therefore, performing the perspective discrimination on the backlit road images can reduce an influence of image brightness on a lane line recognition, and at the same time the coordinate values of all pixel points in the region of interest are transformed by a unified transformation matrix to ensure a transformation consistency of a target coordinate value. Position of the lane lines in the backlit road images can be preliminarily determined by the target detection algorithm, and the region of interest including the lane lines can be preliminarily selected from the backlit road images according to the position of the lane lines.

In one embodiment, the electronic device transforming the region of interest to obtain the bird's-eye view area of the lane lines, includes: the electronic device selects target pixel points having a preset quantity from the region of interest, and obtains initial coordinate value of each target pixel point in the region of interest; further, the electronic device calculates a transformation matrix based on preset coordinate values corresponding to each initial coordinate value and a number of the initial coordinate values; furthermore, the electronic device calculates the target coordinate value of each pixel point in the region of interest according to the coordinate value of each pixel point in the region of interest and the transformation matrix; furthermore, the electronic device transforms the pixel value of each pixel point in the region of interest into the target coordinate value corresponding to the pixel point, so as to obtain the bird's-eye view area of the lane lines.

In one embodiment, the preset quantity can be set according to a shape of the region of interest, which is not limited in the present application. For example, if the region of interest is a quadrilateral, the preset quantity can be 4, and the target pixel points having the preset quantity can be the initial pixel points in a first row and in a first column of the region of interest, the initial pixel points in the first row and in a last column of the region of interest, the initial pixel points in the first column and in a last row of the region of interest, the initial pixel points in the last column and in the last row of the region of interest. A quantity of the preset coordinate values is the same as the preset quantity. The preset coordinate value can be set by according to actual needs, and the present application does not limit it. The preset coordinate value includes a preset abscissa value and a preset ordinate value. The initial coordinate value includes an initial abscissa value and an initial ordinate value, and the target coordinate value includes a target abscissa value and a target ordinate value.

In one embodiment, the electronic device multiplies the coordinate value of each pixel point in the region of interest by the transformation matrix to obtain the target coordinate value of each pixel point in the region of interest.

In one embodiment, the electronic device calculating the transformation matrix based on the preset coordinate value corresponding to each initial coordinate value and the number of the initial coordinate values, includes: the electronic device constructs a homogeneous pixel matrix corresponding to each initial coordinate value according to a default value, the initial abscissa value and the initial ordinate value in each initial coordinate value; further, the electronic device constructs a parameter matrix corresponding to the homogeneous pixel matrix according to a number of preset parameters; furthermore, the electronic device multiplies the parameter matrix with each homogeneous pixel matrix to obtain a multiplication expression corresponding to each initial coordinate value; furthermore, the electronic device constructs equations according to the multiplication expression corresponding to each initial coordinate value and the preset coordinate value corresponding to each initial coordinate value; furthermore, the electronic device solves the equations to obtain the parameter values corresponding to each preset parameter; and the electronic device replaces each preset parameter in the parameter matrix with a corresponding parameter value to obtain the transformation matrix. For example, the preset parameters may include a, b, c, for example, after the parameter value corresponding to each preset parameter is calculated, the parameter value is used to replace the corresponding preset parameter, for example, the parameter value corresponding to parameter a is 1, in the parameter matrix, the parameter a can be replaced by 1.

In one embodiment, the homogeneous pixel matrix and the parameter matrix have a same dimensions. For example, if a quantity of rows of the homogeneous pixel matrix is 3, a quantity of columns of the parameter matrix is 3. The default value is 1. For example, if the initial abscissa value is x and the initial ordinate value is y, then the homogeneous pixel matrix is $$\begin{bmatrix} x \\ y \\ 1 \end{bmatrix}.$$

In one embodiment, since the histogram equalization can enhance an image contrast of the bird's-eye view area of the lane lines, it can make the lane lines in the grayscale image clearer. In addition, since the color of the lane lines in the grayscale image is brighter than other colors, the pixel values of the pixel points corresponding to the lane lines in the grayscale image will be greater than the pixel values of other pixel points. Therefore, by binarizing the grayscale image, the pixel points of the lane lines in the grayscale image can be accurately distinguished.

In one embodiment, the electronic device generating the splice area based on the bird's-eye view area of the lane lines, the grayscale area, the equalization area, and the binarization area, includes: the electronic device multiplies the pixel values of the bird's-eye view area of the lane lines with the pixel values of the corresponding pixel points in the binarized area to obtain the first pixel values, and adjusts the pixel value of each pixel point in the bird's-eye view area of the lane lines to a corresponding first pixel value to obtain a first area; multiplies the pixel values of the corresponding pixel points in the grayscale area with the pixel values of the corresponding pixel points in the binarized area to obtain a second pixel value, adjusts the pixel value of each pixel point in the grayscale area to a corresponding second pixel value to obtain a second area; then, the electronic device multiplies the pixel values of the corresponding pixel points in the binarization area and the pixel values of the corresponding pixel points in the equalization area to obtain a third pixel value, and adjusts the pixel value of each pixel in the equalization area to a corresponding third pixel value to obtain a third area; the electronic device splices the first area, the second area, and the third area to obtain the splice area.

In one embodiment, the first area, the second area, and the third area are stitched together to obtain the splice area. Since the splice area combines lane line features of multiple areas, therefore, the lane line features in the splice area can be made more obvious.

In one embodiment, the electronic device splicing the first area, the second area, and the third area to obtain the splice area, includes: the electronic device obtains a first matrix corresponding to the first area, and obtains a second matrix corresponding to the second area, and obtains a third matrix corresponding to the third area; further, the electronic device splices the first matrix, the second matrix, and the third matrix to obtain the splice area.

In one embodiment, the splice area is a three-dimensional area.

At block 103, the electronic device inputs the splice area input into a preset trained lane line detection model to obtain lane line detection images.

In at least one embodiment of the present application, the preset trained lane line detection model includes feature extraction layer. The feature extraction layers include convolutional layers, pooling layers, and batch normalization layers, for example.

In at least one embodiment of the present application, before inputting the splice area into the preset trained lane line detection model, the method also includes: the electronic device obtains the lane line detection network, lane line training images, and labeling result of the lane line training images; further, the electronic device inputs the lane line training images into the lane line detection network for feature extraction to obtain lane line feature maps; furthermore, the electronic device performs lane line prediction on each pixel point in the lane line feature maps, and obtains prediction result of the lane line feature maps; furthermore, the electronic device adjusts parameters of the lane line detection network according to the prediction result and the labeling result to obtain the preset trained lane line detection model.

In one embodiment, the electronic device uses the feature extraction layers to perform feature extraction on the lane line training images to obtain the lane line feature maps.

In one embodiment, the labeling result includes the position of the first lane lines, the categories of the lane lines and the color of the lane lines. The prediction result includes the lane line prediction curve of the lane line training image, a target position of the lane line prediction curve, a first prediction probability of the target position, a target category of the lane line prediction curve, a second prediction probability of the target category, a target color of the lane line prediction curve, and a third prediction probability of the target color.

In one embodiment, there are multiple lane line training images, and each lane line training image includes lane lines. The labeling results in the multiple lane line training images include a position of a first lane line of each lane line training image, multiple lane line categories, and multiple lane line colors. The lane line categories include, but are not limited to a center line of two-lane road surface, a roadway dividing line, a roadway edge line, and the like. The multiple lane line colors include, but are not limited to yellow, white, for example.

In one embodiment, the electronic device performs lane line prediction on each pixel point in each lane line feature map, and obtains multiple initial coordinates, multiple initial categories, multiple initial colors, the coordinate probability corresponding to each of the initial coordinates, the category probability corresponding to each of the initial categories, and the color probability corresponding to each of the initial colors; further, the electronic device determines the initial coordinate corresponding to the maximum coordinate probability as the target position, determines the initial category corresponding to the maximum category probability as the target category, and determines the initial color corresponding to the maximum color probability as the target color; furthermore, the electronic device determines the pixel points whose target category is the lane line category as the lane line pixel points; furthermore, the electronic device performs fitting based on the lane line pixel points, the target color of each lane line pixel point, and the target position of each lane line pixel point to obtain the lane line prediction curve.

In one embodiment, the electronic device adjusting the parameters of the lane line detection network according to the prediction result and the labeling result to obtain the preset trained lane line detection model, includes: the electronic device calculates prediction index of a lane line detection network according to the prediction result and the labeling result; further, the electronic device adjusts the parameters of the lane line detection network based on the predictive index until the predictive index satisfies a preset condition, and obtains the preset trained lane line detection model.

In one embodiment, the prediction index includes a prediction accuracy or a training loss value. When the prediction index is the prediction accuracy, the preset condition can be that the prediction accuracy rate is greater than or equal to a preset threshold or the prediction accuracy rate no longer increases, and the preset threshold value can be set by itself, which is not limited in present application. When the predictive index is the training loss value, the preset condition can be that the training loss value drops to a preset configuration value or the training configuration value drops to a minimum value, and the preset configuration value may be set in advance, which is not limited here.

When the prediction index is the prediction accuracy, the electronic device calculating the prediction index of the lane line detection network according to the prediction result and the labeling result, includes: the electronic device calculates a training quantity of the lane line training images; further, the electronic device calculates a predicted quantity of the prediction result corresponding to the labeling result; and furthermore, the electronic device calculates a ratio of the predicted quantity to the training quantity to obtain the prediction accuracy rate.

In other embodiments of the present application, the lane line detection network can also be a SegNet network, a U-Net network, or an FCN a network.

In one embodiment, when the prediction index is the training loss value, the electronic device calculating the prediction index of the lane line detection network according to the prediction result and the labeling result, includes: the electronic device calculates a first loss value corresponding to the initial coordinates, calculates a second loss value corresponding to the initial categories, and calculates a third loss value corresponding to initial colors; further, the electronic device performs a weighted summation operation on the first loss value, the second loss value and the third loss value to obtain target loss values corresponding to each of the lane line training images; further, the electronic device sums the target loss values corresponding to the lane line training images to obtain the training loss value.

In one embodiment, the electronic device uses one-hot encoding to encode the initial categories of each of the lane line training images to obtain an encoding vector, and the initial categories include the lane line category of each lane line feature map. The encoding vector includes element values corresponding to each initial category. Further, the electronic device calculates a second loss value according to the training quantity, the category quantity of the initial categories, the encoding vector, and the category probabilities corresponding to the initial categories.

In one embodiment, a second loss value is calculated according to a formula:

$$J = -\frac{1}{M}\sum_{i=1}^{M}\sum_{j=I}^{N} y_{ij}\log(p_{ij}),$$

where, J represents the second loss value, M represents the training quantity, N represents the category quantity, yij represents a jth element in the encoding vector of the ith lane line training image, and pij represents the category probability corresponding to the jth category of the ith lane line training image.

For example, when the lane line category of any one lane line training image is the roadway dividing line, and the initial categories are the center line of two-lane road surface, the roadway dividing line, and the roadway edge line, and the category quantity of the initial categories is 3, the encoding vector obtained by using one-hot encoding is $$\begin{bmatrix} 0 \\ 0 \\ 1 \end{bmatrix}.$$

When the category probabilities corresponding to the initial categories are $$\begin{bmatrix} 0.1 \\ 0.2 \\ 0.7 \end{bmatrix},$$

the target loss value of any one lane line training image is $$-\frac{0*\ln 0.1 + 0*\ln 0.2 + 1*\ln 0.7}{3} \approx 0.35.$$

Figure 3:
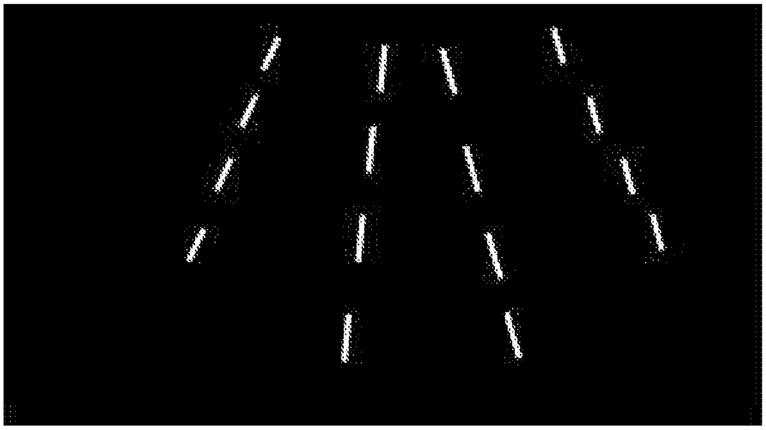
FIG. 3 is a schematic diagram of one embodiment of a lane line detection image.

In one embodiment, a generation process of the first loss value and the third loss value is basically the same as the generation process of the second loss value, so the present application will not repeat them here. The generation process of the lane line detection image is basically the same as the training process of the lane line detection model, so the present application will not repeat them here. FIG. 3 illustrates the lane line detection images. The lane lines in FIG. 3 are white dotted lines. The white dotted lane lines in FIG. 3 are regarded the lane line in the top view.

In one embodiment, the electronic device determines whether the lane line detection network converges by using the prediction accuracy rate or the training loss value. When the lane line detection network converges, the training loss value is the smallest or the prediction accuracy is the highest, and the lane line detection model is obtained. Therefore, the detection accuracy of the lane line detection model can be ensured.

At block 104, the electronic device performs an image transformation on the lane line detection images to obtain the transformed images and lane line detection results of the transformed images.

In at least one embodiment of the present application, the image transformation includes inverse perspective transformation, and a process of performing inverse perspective transformation on the lane line detection images is basically a same process of performing perspective transformation on the region of interest, so the present application will not repeat it here.

In at least one embodiment of the present application, the detection result of the lane lines includes the detection result of the transformed images and the prediction curves of the lane lines in the transformed images. In one embodiment, the generation process of the detection result is basically the same as the generation process of the prediction result, so this the present application will not repeat them here.

by the above embodiment, the lane line detection images are transformed into the transformed images, and the lane lines in the transformed images can be restored to user's perspective, which is convenient for the user to view.

Figure 4:
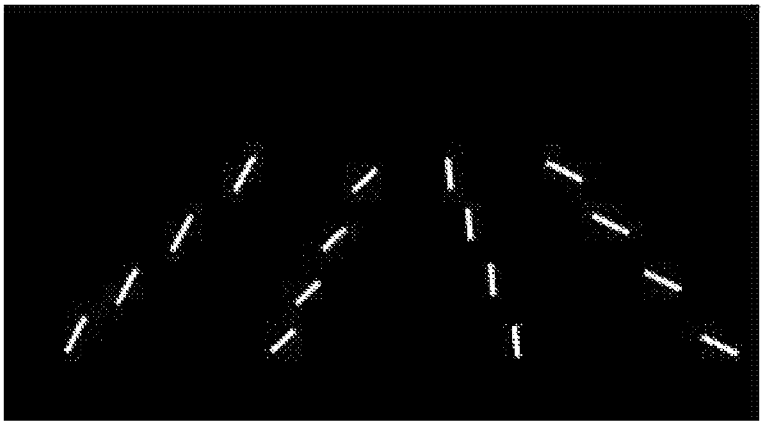
FIG. 4 is a schematic diagram of one embodiment of a transformed image.

Referring to FIG. 4, FIG. 4 illustrates one transformed image. FIG. 4 is generated after performing a perspective transformation on FIG. 3. The white dotted lane lines in FIG.

4 are equivalent to the lane lines of a primary perspective. The primary perspective represents a shooting viewing angle of a shooting device.

It can be seen from the above embodiment, the present application performs image processing on the road images to obtain a splice area, and the image processing includes a perspective transformation, a binarization processing and an image fusion. When the road images are backlit images, since the perspective transformation changes the original projection beamline in the backlit road images, the brightness of the images can be reduced, so the influence of image brightness on lane line recognition can be reduced.

Figure 5:
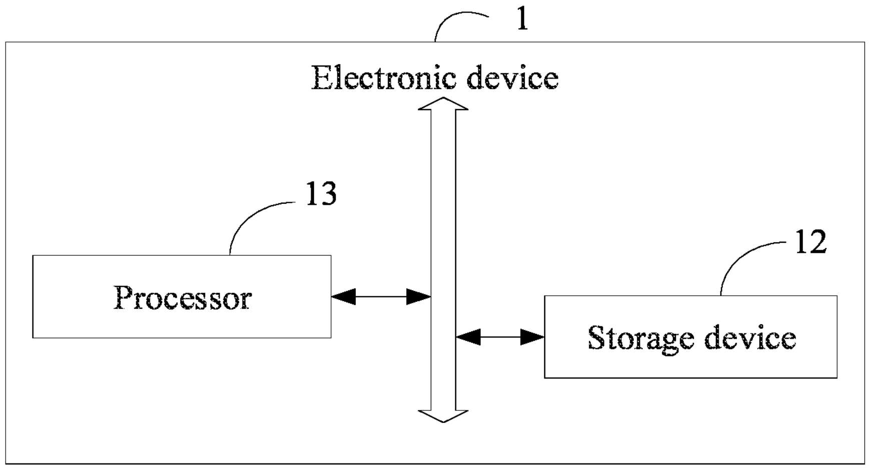
FIG. 5 is a structural diagram of one embodiment of an electronic device performing the method of FIG. 2.

FIG. 5 illustrates a structural diagram of an electronic device. In one embodiment, the electronic device 1 includes, but is not limited to, a storage device 12, a processor 13, and a computer program stored in the storage device 12 and executed by the processor 13. For example, the computer program can be a program of image classification.

Those skilled in the art can understand that the schematic structural diagram is only an example of the electronic device 1, and does not constitute a limitation on the electronic device 1, other examples may include more or less components than the one shown, or combine some components, or have different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, for example. The general-purpose processor can be a microprocessor or the processor can also be any conventional processor, for example. The processor 13 is the computing core and control center of the electronic device 1, and uses various interfaces and lines to connect each part of the electronic device. 1.

The processor 13 obtains the operating system of the electronic device 1 and obtains various installed applications. The processor 13 obtains the application program to implement each block in the embodiments of the method, for example, to implement each block shown in FIG. 2.

Exemplarily, the computer program can be divided into one or more modules/units, and the one or more modules/units are stored in the storage device 12 and retrieved by the processor 13 to achieve the application of the method. The one or more modules/units may be a series of computer program instruction segments capable of performing specific functions, and the instruction segments describe the process of acquisition the computer program in the electronic device 1.

The storage device 12 can be used to store the computer programs and/or modules, and the processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, for example), and the like; the area for storing data may store the data created in the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the method implements all or part of the processes in the methods of the above embodiments, and can also be completed by instructing the relevant hardware through a computer program. The computer program can be stored in a computer-readable storage medium, and when the computer program is acquired by the processor, the blocks of the method embodiments can be implemented.

The computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 2, the storage device 12 in the electronic device 1 stores a plurality of instructions to implement the method for classifying images, and the processor 13 can acquire the plurality of instructions to implement processes of: obtaining images to be classified, and obtaining a number of classification models; replacing the global average pooling layers of each of the classification models with convolutional layers and average pooling layers to obtain target models, each of the target models including input layers, convolutional layers, average pooling layers, and classification layers; performing image segmentation on the images to be classified and obtaining target images; inputting the target images to each of the input layers to generate target feature maps; generating target values according to the size of each of the target feature maps; using the convolution layers to perform a convolution operation on the target feature maps to generate feature values; generating a target vector of each of the target models according to the average pooling layers, the feature values, and the target values; inputting the target vector into the classification layers of corresponding target models to obtain label categories and corresponding probability values; determining classification according to the label categories and the corresponding probability values.

Specifically, for the specific implementation method of the above-mentioned instruction by the processor 13, reference may be made to the description of the relevant blocks in the corresponding embodiment of FIG. 2, and details are not repeated.

In the several embodiments provided in this application, it should be understood that the devices and methods disclosed can be implemented by other means. For example, the device embodiments described above are only schematic. For example, the division of the modules is only by logical function, and can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present application can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, for example) or processor to execute the method described in the embodiment of the present application.

The present application is not limited to the details of the above-described exemplary embodiments, and the present application can be embodied in other specific forms without departing from the spirit or essential characteristics of the present application. Therefore, the present embodiments are to be considered as illustrative and not restrictive, and the scope of the present application is defined by the appended claims. All changes and variations in the meaning and scope of equivalent elements are included in the present application. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description only represents some embodiments of the present application and is not intended to limit the present application, and various modifications and changes can be made to the present application. Any modifications, equivalent substitutions, improvements, for example made within the spirit and scope of the present application are intended to be included within the scope of the present application.

What is claimed is:

1. A method for detecting lane lines comprising:

obtaining road images;

obtaining a splice area by performing an image processing on the road images, comprising: obtaining a region of interest by performing a lane line detection on the road images; obtaining a bird's-eye view area of the lane lines by transforming the region of interest, comprising: changing original projection beamline in the region of interest by a perspective transformation, and reducing brightness of the bird's-eye view area of the lane lines;

inputting the splice area into a preset trained lane line detection model and obtaining lane line detection images; and obtaining transformed images and lane line detection results of the transformed images by performing an image transformation on the lane line detection images, comprising: obtaining the transformed images and the lane line detection results by performing an inverse perspective transformation on the lane line detection image.

2. The method for detecting lane lines as recited in claim 1, wherein obtaining the splice area by performing the image processing on the road images, comprises:

obtaining a grayscale area by performing a grayscale histogram equalization processing on the bird's-eye view area of the lane lines;

obtaining a binarized area by performing a binarization processing on the grayscale area;

obtaining a target area by converting the bird's-eye view area of the lane lines from an initial color space to a target color space, obtaining an equalized area by performing a histogram equalization processing on each channel of the target area; and generating the splice area according to the bird's-eye view area of the lane lines, the grayscale area, the equalization area, and the binarization area.

3. The method for detecting lane lines as recited in claim 2, wherein obtaining the bird's-eye view area of the lane lines by transforming the region of interest, comprises:

selecting target pixel points having a preset quantity from the region of interest, and obtaining an initial coordinate value of each target pixel point in the region of interest;

calculating a transformation matrix according to preset coordinate values corresponding to each initial coordinate value and a plurality of the initial coordinate values;

calculating a target coordinate value of the each pixel point in the region of interest according to a coordinate value of the each pixel point in the region of interest and the transformation matrix; and transforming a pixel value of the each pixel point in the region of interest into a target coordinate value corresponding to the pixel point, and obtaining the bird's-eye view area of the lane lines.

4. The method for detecting lane lines as recited in claim 3, wherein calculating the transformation matrix according to the preset coordinate values corresponding to each initial coordinate value and the plurality of the initial coordinate values, comprises:

constructing a homogeneous pixel matrix corresponding to each initial coordinate value according to a default value, an initial abscissa value and an initial ordinate value in each initial coordinate value;

constructing a parameter matrix corresponding to the homogeneous pixel matrix according to a plurality of preset parameters;

obtaining a multiplication expression corresponding to each initial coordinate value by multiplying the parameter matrix with each homogeneous pixel matrix;

constructing a plurality of equations according to the multiplication expression corresponding to each initial coordinate value and the preset coordinate values corresponding to each initial coordinate value; and solving the plurality of equations to obtain parameter values corresponding to each preset parameter; and replacing the each preset parameter in the parameter matrix with a corresponding parameter value, and obtaining the transformation matrix.

5. The method for detecting lane lines as recited in claim 2, wherein generating the splice area according to the bird's-eye view area of the lane lines, the grayscale area, the equalization area, and the binarization area, comprises:

obtaining first pixel values by multiplying pixel values of the bird's-eye view area of the lane lines with pixel values of corresponding pixel points in the binarized area, and obtaining a first area by adjusting a pixel value of each pixel point in the bird's-eye view area of the lane lines to a corresponding first pixel value;

obtaining a second pixel value by multiplying pixel values of the corresponding pixel points in the grayscale area with the pixel values of the corresponding pixel points in the binarized area, obtaining a second area by adjusting the pixel value of each pixel point in the grayscale area to a corresponding second pixel value;

obtaining a third pixel value by multiplying the pixel values of the corresponding pixel points in the binarization area and the pixel values of the corresponding pixel points in the equalization area, and obtaining a third area by adjusting a pixel value of each pixel point in the equalization area to a corresponding third pixel value; and obtaining the splice area by splicing the first area, the second area, and the third area.

6. The method for detecting lane lines as recited in claim 1, wherein before inputting the splice area into the preset trained lane line detection model, the method further comprises:

obtaining a lane line detection network, lane line training images, and a labeling result of the lane line training images;

inputting the lane line training images into the lane line detection network for feature extraction and obtaining lane line feature maps;

obtaining a prediction result of the lane line feature maps by performing a lane line prediction on each pixel point in the lane line feature maps; and obtaining the preset trained lane line detection model by adjusting parameters of the lane line detection network according to the prediction result and the labeling result.

7. The method for detecting lane lines as recited in claim 6, wherein obtaining the preset trained lane line detection model by adjusting parameters of the lane line detection network according to the prediction result and the labeling result, comprises:

calculating a prediction index of the lane line detection network according to the prediction result and the labeling result; and obtaining the preset trained lane line detection model by adjusting the parameters of the lane line detection network according to the predictive index until the predictive index satisfies a preset condition.

8. The method for detecting lane lines as recited in claim 7, wherein calculating the prediction index of the lane line detection network according to the prediction result and the labeling result, comprises:

calculating a training quantity of the lane line training images; and calculating a predicted quantity of the prediction result corresponding to the labeling result, and obtaining the prediction accuracy rate by calculating a ratio between the predicted quantity and the training quantity.

9. An electronic device comprising:

a processor; and a non-transitory storage medium, coupled to the processor, and stores a plurality of instructions, which cause the processor to:

obtain road images;

obtain a splice area by performing an image processing on the road images, comprising: obtaining a region of interest by performing a lane line detection on the road images; obtaining a bird's-eye view area of the lane lines by transforming the region of interest, comprising: changing original projection beamline in the region of interest by a perspective transformation, and reducing brightness of the bird's-eye view area of the lane lines;

input the splice area into a preset trained lane line detection model and obtain lane line detection images; and obtain transformed images and lane line detection results of the transformed images by performing an image transformation on the lane line detection images, comprising: obtaining the transformed images and the lane line detection results by performing an inverse perspective transformation on the lane line detection image.

10. The electronic device as recited in claim 9, wherein the plurality of instructions are further configured to cause the processor to:

obtain a grayscale area by performing a grayscale histogram equalization processing on the bird's-eye view area of the lane lines;

obtain a binarized area by performing a binarization processing on the grayscale area;

obtain a target area by converting the bird's-eye view area of the lane lines from an initial color space to a target color space, obtain an equalized area by performing a histogram equalization processing on each channel of the target area; and generate the splice area according to the bird's-eye view area of the lane lines, the grayscale area, the equalization area, and the binarization area.

11. The electronic device as recited in claim 10, wherein the plurality of instructions are further configured to cause the processor to:

select target pixel points having a preset quantity from the region of interest, and obtain an initial coordinate value of each target pixel point in the region of interest;

calculate a transformation matrix according to preset coordinate values corresponding to each initial coordinate value and a plurality of the initial coordinate values;

calculate a target coordinate value of the each pixel point in the region of interest according to a coordinate value of the each pixel point in the region of interest and the transformation matrix; and transform a pixel value of the each pixel point in the region of interest into a target coordinate value corresponding to the pixel point, and obtain the bird's-eye view area of the lane lines.

12. The electronic device as recited in claim 11, wherein the plurality of instructions are further configured to cause the processor to:

construct a homogeneous pixel matrix corresponding to each initial coordinate value according to a default value, an initial abscissa value and an initial ordinate value in each initial coordinate value;

construct a parameter matrix corresponding to the homogeneous pixel matrix according to a plurality of preset parameters;

obtain a multiplication expression corresponding to each initial coordinate value by multiplying the parameter matrix with each homogeneous pixel matrix;

construct a plurality of equations according to the multiplication expression corresponding to each initial coordinate value and the preset coordinate values corresponding to each initial coordinate value; and solve the plurality of equations to obtain parameter values corresponding to each preset parameter; and replace the each preset parameter in the parameter matrix with a corresponding parameter value, and obtaining the transformation matrix.

13. The electronic device as recited in claim 10, wherein the plurality of instructions are further configured to cause the processor to:

obtain first pixel values by multiplying pixel values of the bird's-eye view area of the lane lines with pixel values of corresponding pixel points in the binarized area, and obtain a first area by adjusting a pixel value of each pixel point in the bird's-eye view area of the lane lines to a corresponding first pixel value;

obtain a second pixel value by multiplying pixel values of the corresponding pixel points in the grayscale area with the pixel values of the corresponding pixel points in the binarized area, obtain a second area by adjusting the pixel value of each pixel point in the grayscale area to a corresponding second pixel value;

obtain a third pixel value by multiplying the pixel values of the corresponding pixel points in the binarization area and the pixel values of the corresponding pixel points in the equalization area, and obtain a third area by adjusting a pixel value of each pixel point in the equalization area to a corresponding third pixel value; and obtain the splice area by splicing the first area, the second area, and the third area.

14. The electronic device as recited in claim 9, wherein the plurality of instructions are further configured to cause the processor to:

obtain a lane line detection network, lane line training images, and a labeling result of the lane line training images;

input the lane line training images into the lane line detection network for feature extraction and obtaining lane line feature maps;

obtain a prediction result of the lane line feature maps by performing a lane line prediction on each pixel point in the lane line feature maps; and obtain the preset trained lane line detection model by adjusting parameters of the lane line detection network according to the prediction result and the labeling result.

15. The electronic device as recited in claim 14, wherein the plurality of instructions are further configured to cause the processor to:

calculate a prediction index of the lane line detection network according to the prediction result and the labeling result; and obtain the preset trained lane line detection model by adjusting the parameters of the lane line detection network according to the predictive index until the predictive index satisfies a preset condition.

16. The electronic device as recited in claim 15, wherein the plurality of instructions are further configured to cause the processor to:

calculate a training quantity of the lane line training images; and calculate a predicted quantity of the prediction result corresponding to the labeling result, and obtain the prediction accuracy rate by calculating a ratio between the predicted quantity and the training quantity.

17. A non-transitory storage medium having stored thereon instructions that, when executed by at least one processor of an electronic device, causes the at least one processor to perform a method for detecting lane lines, the method comprising:

obtaining road images;

obtaining a splice area by performing an image processing on the road images, comprising: obtaining a region of interest by performing a lane line detection on the road images; obtaining a bird's-eye view area of the lane lines by transforming the region of interest, comprising: changing original projection beamline in the region of interest by a perspective transformation, and reducing brightness of the bird's-eye view area of the lane lines;

inputting the splice area into a preset trained lane line detection model and obtaining lane line detection images; and obtaining transformed images and lane line detection results of the transformed images by performing an image transformation on the lane line detection images, comprising: obtaining the transformed images and the lane line detection results by performing an inverse perspective transformation on the lane line detection image.

18. The non-transitory storage medium as recited in claim 17, wherein obtaining the splice area by performing the image processing on the road images comprises:

obtaining a grayscale area by performing a grayscale histogram equalization processing on the bird's-eye view area of the lane lines;

obtaining a binarized area by performing a binarization processing on the grayscale area;

obtaining a target area by converting the bird's-eye view area of the lane lines from an initial color space to a target color space, obtaining an equalized area by performing a histogram equalization processing on each channel of the target area; and generating the splice area according to the bird's-eye view area of the lane lines, the grayscale area, the equalization area, and the binarization area.

19. The non-transitory storage medium as recited in claim 18, wherein obtaining the bird's-eye view area of the lane lines by transforming the region of interest, comprises:

selecting target pixel points having a preset quantity from the region of interest, and obtaining an initial coordinate value of each target pixel point in the region of interest;

calculating a transformation matrix according to preset coordinate values corresponding to each initial coordinate value and a plurality of the initial coordinate values;

calculating a target coordinate value of the each pixel point in the region of interest according to a coordinate value of the each pixel point in the region of interest and the transformation matrix; and transforming a pixel value of the each pixel point in the region of interest into a target coordinate value corresponding to the pixel point, and obtaining the bird's-eye view area of the lane lines.

20. The non-transitory storage medium as recited in claim 19, wherein calculating the transformation matrix according to the preset coordinate values corresponding to each initial coordinate value and the plurality of the initial coordinate values, comprises:

constructing a homogeneous pixel matrix corresponding to each initial coordinate value according to a default value, an initial abscissa value and an initial ordinate value in each initial coordinate value;

constructing a parameter matrix corresponding to the homogeneous pixel matrix according to a plurality of preset parameters;

obtaining a multiplication expression corresponding to each initial coordinate value by multiplying the parameter matrix with each homogeneous pixel matrix;

constructing a plurality of equations according to the multiplication expression corresponding to each initial coordinate value and the preset coordinate values corresponding to each initial coordinate value; and solving the plurality of equations to obtain parameter values corresponding to each preset parameter; and replacing the each preset parameter in the parameter matrix with a corresponding parameter value, and obtaining the transformation matrix.

* * * * *